(12) United States Patent
Walz (10) Patent No.: US 7,415,639 B2
(45) Date of Patent: Aug. 19, 2008

(54) METHOD OF MONITORING A DATA LINK

(75) Inventor: Jochen Walz, Bondorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 602 days.

(21) Appl. No.: 10/524,962

(22) PCT Filed: Aug. 12, 2003

(86) PCT No.: PCT/IB03/03617

§ 371 (c)(1),
(2), (4) Date: Feb. 18, 2005

(87) PCT Pub. No.: WO2004/019589

PCT Pub. Date: Mar. 4, 2004

(65) Prior Publication Data

US 2005/0283684 A1    Dec. 22, 2005

(30) Foreign Application Priority Data

Aug. 21, 2002  (DE) .............................. 102 38 080

(51) Int. Cl.
*G06F 11/00* (2006.01)

(52) U.S. Cl. .......................................... 714/57; 714/57

(58) Field of Classification Search .................. 714/43, 714/57; 715/735–738
See application file for complete search history.

(56) References Cited

U.S. PATENT DOCUMENTS 6,112,015 A * 8/2000 Planas et al. ................. 709/223

(Continued)

FOREIGN PATENT DOCUMENTS

DE    199 46 742 C2    8/2003

(Continued)

OTHER PUBLICATIONS

Comer, Douglas, et al.; High-Speed Propagation of Link Status Routing Control Information; 1990; IEEE; pp. 190-194.

*Primary Examiner*—Bryce P Bonzo (57) ABSTRACT

In a method of monitoring the reliability of a data link for a data transmission between a server (2) and a client (8), a control unit (14) is triggered by a trigger signal in such a manner that in response to the arrival of the trigger signal the control unit (14) generates first control data for a predetermined running time which commences anew in response to each trigger signal received. The first control data forms a first control representation (23) on a client display screen (11), which first control representation optically indicates the existence of a reliable data link (4) to a user. The control unit (14) generates, after expiration of the running time, second control data which generates a second control representation (23') on the client display screen (11) which optically indicates the absence of a reliable data link to the user. A control unit (15) periodically transmits a test message to a test unit (18). The test unit (18) returns the incoming test message or another test message to the server (2). The control unit (14) is triggered again only if the returned test message is in order. The period with which the control unit (15) repeats the transmission of the test messages is shorter than the running time during which the control unit (14) generates the first control data.

20 Claims, 3 Drawing Sheets

U.S. PATENT DOCUMENTS

| | | | |
|---|---|---|---|
| 6,559,862 B1* | 5/2003 | Nakazawa | 715/738 |
| 6,574,503 B2* | 6/2003 | Ferek-Petric | 600/523 |
| 6,590,587 B1* | 7/2003 | Wichelman et al. | 715/736 |
| 6,624,830 B1* | 9/2003 | Beck et al. | 715/771 |
| 6,728,219 B1* | 4/2004 | Leong et al. | 370/252 |
| 7,047,496 B2* | 5/2006 | Nelles et al. | 715/736 |
| 7,099,438 B2* | 8/2006 | Rancu et al. | 379/9 |
| 7,386,795 B2* | 6/2008 | Kumar et al. | 715/733 |
| 2002/0068962 A1* | 6/2002 | Ferek-Petric | 607/60 |
| 2002/0147809 A1* | 10/2002 | Vinberg | 709/224 |
| 2005/0114795 A1* | 5/2005 | Beaudoin | 715/854 |
| 2006/0031480 A1* | 2/2006 | Nijemcevic et al. | 709/224 |
| 2006/0129939 A1* | 6/2006 | Nelles et al. | 715/736 |
| 2008/0052628 A1* | 2/2008 | Bugenhagen et al. | 715/736 |

FOREIGN PATENT DOCUMENTS

| | | |
|---|---|---|
| EP | 0 510 822 A2 | 10/1992 |
| EP | 1 097 672 A1 | 5/2001 |
| WO | WO 01/03575 A1 | 1/2001 |
| WO | WO 01/65373 A1 | 9/2001 |

* cited by examiner

METHOD OF MONITORING A DATA LINK

The invention relates to a method of monitoring the reliability of a data link for a data transmission between a server data processing apparatus and a client data processing apparatus. The invention also relates to a software package which is suitable for carrying such a method.

U.S. Pat. No. 6,350,237 discloses a childbirth monitoring device which acquires patient data, for example, the heartbeat of a fetus and contractions of the uterus of the mother, so as to make this data available to a server. A user, for example, a physician or a nurse, can log in to a server PC, via a data link, by means of a client PC. In this case a data link is used in the form of a data network, notably the Internet. In this system it is in principle possible to access the patient data from any location, that is, in as far as an appropriate Internet connection is available. This system thus enables remote monitoring of the patient or patients.

For the monitoring of continuously acquired patient data, for example, the heartbeat, it is of decisive importance that the patient data displayed on the display screen of the client are essentially coherent in time with the patient data acquired by the monitoring device. A time delay between the acquisition of data from the patient and the output of data on the client display screen may have a life-endangering effect in given circumstances. When an open data network, such as the Internet, is used as a data link for the data transmission, however, delays may occur in the data transmission, because the speed of the data transmission in an open network also depends inter alia on the number of users currently using the network for data transmission. On the one hand, it may then occur that no data transmission takes place for an undesirably long period of time, so that the patient data displayed on the client display screen is not updated during this prolonged period of time. On the other hand, it may occur that the patient data is transmitted to the client at a rate which is lower than the rate of acquisition of data from the patient. As a result, the patient data displayed on the client display screen may start to trail behind the current patient condition more and more. These two examples of imperfect data transmission could remain unnoticed by the user or be noticed only accidentally, so that there is a greater risk of endangering the patient or patients.

U.S. Pat. No. 6,635,017 discloses a system which enables communication, via the Internet, with a medical apparatus implanted in a patient. To this end, the implanted medical apparatus communicates with a server which itself is connected to the Internet whereto to the client can be connected. The communication via the Internet takes place via a first channel and via a second channel. In the cited document it is proposed to transmit a first data stream via the first channel, which first data stream contains a reception acknowledgement which is retransmitted to the transmitter in the opposite direction as soon as the first data stream has been received correctly by the receiver. The communication established between the server and the client via the first channel is comparatively reliable, but also comparatively slow. In the known system the reliability of the data link is effectively tested via the first channel. In contrast therewith, a second data stream is transmitted via the second channel, which second data stream does not contain a reception acknowledgement. Consequently, the second data stream reaches a higher transmission rate, but the reliability of the data transmission is reduced in proportion.

In the known system it is thus possible to transmit patient data via the second channel and to test, in parallel therewith, the reliability of the data link via the first channel. In cases where the data link per se operates correctly but too slowly, this shortcoming can usually not be determined on the basis of the retransmitted reception acknowledgement.

The present invention has for its object to provide a possibility for improving the monitoring of the reliability of a data link which provides increased reliability notably in respect of the transmission of the data in real time.

A control unit of a server application run on the server is configured in such a manner that, for as long as it is driven in time by means of a trigger signal, it indicates the existence of a reliable data link on the display screen, the control unit being driven by the trigger signal only if a previously executed test procedure has successfully tested that a reliable data link exists between the client and the server. If the test result of the test procedure fails to appear or is excessively delayed, the trigger signal also remains absent or is delayed. Consequently, the control unit cannot be triggered in time, so that it produces a different indication on the client display screen so as to signal the user that the data link is not reliable (at that instant).

The reliability of the data link is then tested by sending a test message from the server to the client and in that, in dependence on this test message, the client returns the same test message or a different test message to the server. If an inadmissible time delay occurs between the transmission and retransmission of the test messages, a corresponding time delay occurs in respect of the presence of the test result, so that the control unit is not triggered in time. If the trigger signal fails to appear, the control unit automatically generates an appropriate warning indication on the client screen.

Notably with a view to real-time data transmission the invention offers the user more reliability that the output data displayed on the client display screen is essentially coherent in time with the output data presented on the server. The advantages of the method become manifest notably for the remote supervision of patients when an open data network, notably the Internet, is used for the data transmission.

In conformity with a particularly advantageous embodiment the trigger signal is formed by the test message retransmitted by a test unit of a client application run on the client, the test unit then transmitting the trigger signal to the control unit which is triggered by the control unit exclusively if this signal is in order. The triggering of the control unit of the server thus takes place quasi by the test unit of the client which itself is driven by the test message transmitted by a control unit of the server application so as to output the trigger signal. In this embodiment particularly simple testing of the real-time data transmission is achieved, without it being necessary to perform an intricate test on the test messages transmitted to and fro.

A further simplification is obtained when the trigger signal is formed by the test message transmitted by the control unit; in this case the test unit merely has to retransmit this test message, that is, the trigger signal. According to this version the control unit periodically transmits the trigger signal required for driving the control unit to the test unit which itself returns this trigger signal to the control unit so as to trigger the control unit. Because the transmitted data need not be modified and need not be especially tested, a particularly simple configuration is obtained for the programs involved.

In a further special embodiment the test unit is capable of generating an error message in cases where no test message from the control unit reaches the test unit during a predetermined test period which is longer than the period of the test procedure; this error message is then applied directly to the representation unit which then reproduces a suitable warning on the client display screen on the basis of this error message, which warning can be optically perceived by the user. As a result of this approach, an error in the data link can be recognized also when the control unit is also triggered, due to an incorrect functioning, when the control unit does not transmit test messages to the test unit. Furthermore, such an error message, produced directly on the client, can automatically be displayed in the foreground on the client display screen, whereas the actual display of the client application can also take place in the background, so that an error message from or triggered by the server cannot be noticed directly by the user.

Further important characteristics and advantages of the invention are disclosed in the dependent claims, the drawings and the associated description which is given with reference to the Figures.

It is to be understood that the foregoing characteristics and those to be described hereinafter can be used not only in the indicated combinations, but also in other combinations or independently, without departing from the scope of the invention.

Preferred embodiments of the invention are shown in the drawings and will be described in detail hereinafter; corresponding reference numerals in the description relate to identical or functionally corresponding or similar components.

Figure 1:
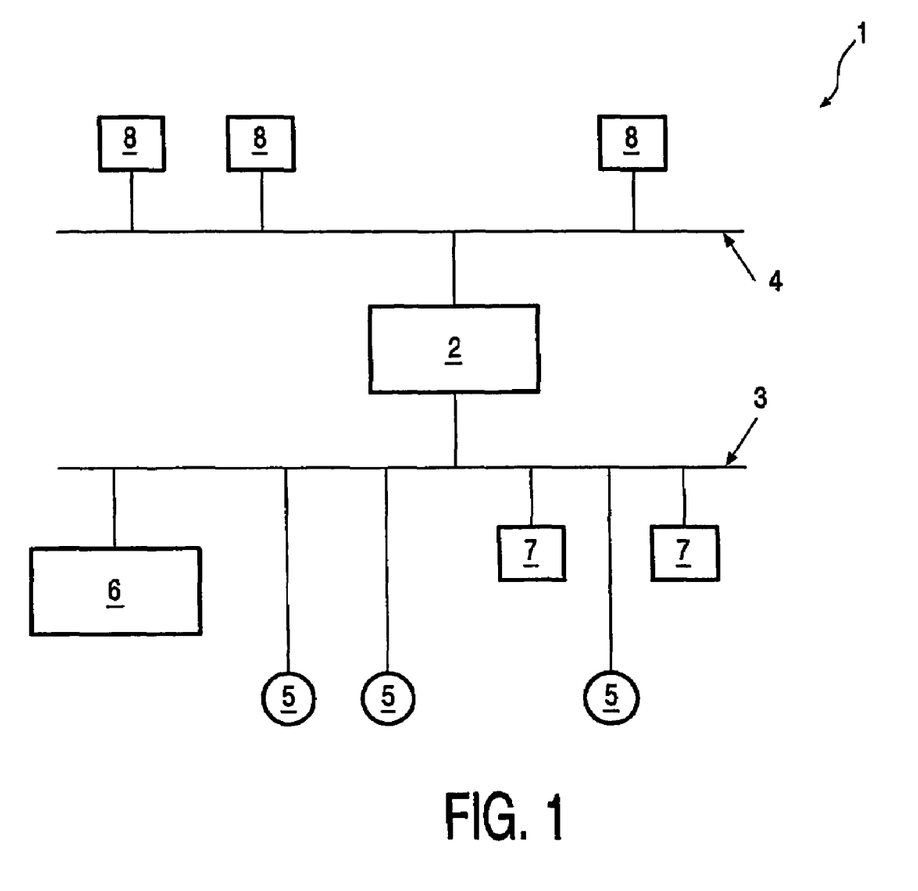
FIG. 1 illustrates the principle in the form of a circuit diagram of a data processing system in which the method in accordance with the invention can be used.

As is shown in FIG. 1, a server data processing system 2 (referred to hereinafter only as server 2) in a network 1 may be connected to an internal data network 3 and to an external data network 4. The internal data network 3 is customarily a closed data network 3 so that, for example, the number of users having access to the closed data network 3 can be monitored. Notably the capability in respect of the reliability of the data transmission and the speed of an internal data network are known. For example, the internal and/or closed data network 3 is installed in a building, or in a coherent complex of buildings, for example, in a clinic.

In contrast therewith, the external data network 4 is customarily formed by an open network 4 in which it is no longer possible to see by which and by how many users it is accessed. Because the capacity of the external and/or open data network is dependent inter alia on the number of users working with the network, the speed of the data transmission and its reliability may be subject to strong fluctuations.

Because the present invention is of particular interest for the medical field, a preferred application in the context of a patient monitoring system will be described hereinafter by way of example. It will be evident that the method in accordance with the invention is in principle not restricted to any given application. The method in accordance with the invention can be effectively used in all cases involving continuous transmission of data, notably transmission in real time.

One or more patient monitoring devices 5, notably birth monitoring devices, may be connected to the internal and/or closed data network 3; the monitoring devices permanently acquire patient data such as, for example, the heartbeat of a fetus and contractions of the uterus of the mother, and present such data via the internal and/or closed data network 3. Preferably, a further server 6, referred hereinafter as the internal server 6, is connected to the internal/closed data network 3. Whereas the internal server 6 is connected exclusively to the internal/closed data network 3, the other server 2, which may also be referred to as the terminal server 2, communicates with the internal/closed data network 3 as well as with the external/open data network 4. Moreover, one or more client data processing systems 7, also referred to as internal clients 7 hereinafter, are also connected to the internal/closed data network 3.

In contrast therewith, one or more client data processing systems 8, also referred to hereinafter as external clients 8 or as terminal clients 8, are connected to the external/open data network 4 which may be formed notably by the Internet 4. A respective server application program 9 (see FIG. 2) which is capable of preparing or processing the patient data acquired by the patient monitoring devices 5 is installed on the servers 2, 6. The internal clients 7 are provided with a respective client application program 10 (see FIG. 2) which is capable of co-operating with the server application 9 in such a manner that the representation of the patient data as generated by the server application 9 can be displayed on a display screen 11 (see FIG. 2) of the relevant client 7.

The terminal server 2, also being provided with the server application 9, enables the external clients 8 also to access the patient data in as far as the client application 10 is installed in the relevant external client 8.

Because the patient data concerns data which must be updated and displayed within a comparatively short term, preferably in real time, it is very important that the relevant user, for example, a nurse or a physician, can safely assume that the patient data displayed on the relevant client display screen 11 is essentially real-time data. The user requires at least an appropriate warning indication when the up-to-dateness of the displayed data cannot be ensured. Because an external/open data net 4 such as the Internet is not reliable and stable enough to ensure permanently reliable data transmission, further protective measures must be taken in this case. The method in accordance with the invention, which is implemented by means of a software package 12 in accordance with the invention (see FIG. 2) is used for this purpose.

Figure 2:
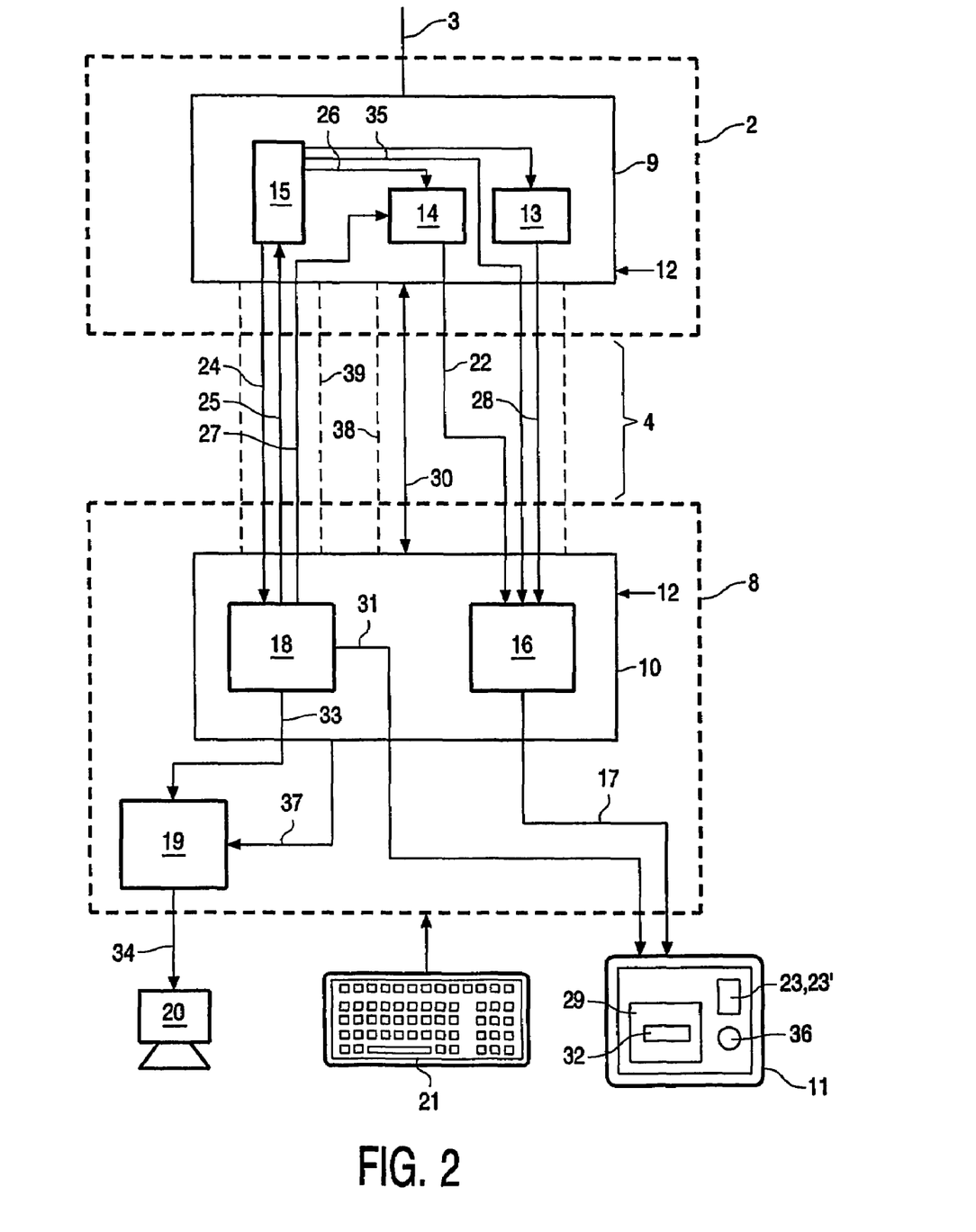
FIG. 2 shows a circuit diagram of a client which communicates with a server via a data link.

In conformity with FIG. 2, the software package 12 comprises the server application 9 and the client application 10. The server application 9 is installed in the terminal server 2 and advantageously also in the internal server 6. When the term "server" is used hereinafter, in most cases the terminal server 2 is meant, but in principle the internal server 6 may also be concerned.

The server application 9 comprises a program or a program section 13 which is referred to hereinafter as the output unit 13. The output unit 13 is responsible for the preparation of the patient data and generates output data therefrom, which output data is suitable for the display of the prepared patient data on a display screen. The server application 9 also comprises a further program or a further program section 14 which is referred to hereinafter as the control unit 14 and serves to generate control data. A further program section or further program 15, referred hereinafter as the control unit 15, serves to trigger or control at least the output unit 13 and the control unit 14.

The client application 10 comprises a program or a program section 16 which is referred to hereinafter as the representation unit 16 and which serves essentially to generate image data which is applied to the client display screen 11 in conformity with an arrow 17 so as to realize the display of an image. It will be evident that the client 8 may comprise a graphic card (not shown) for this purpose, which card is driven by the representation unit 16 and itself drives the client display screen 11. The client application 10 also comprises a further program section or further program 18 which is referred to hereinafter as the test unit 18.

The server 2 is connected on the one side, via the internal data network 3, to at least one patient monitoring device 5 (see FIG. 1) and can be connected on the other side, via the external data network 4 (which is symbolized by an accolade) to the client 8 shown. In as far as the client 8 is logged into the server 2, the data link between the server 2 and the client 8 is formed by the external data network 4. The client 8 shown in this case concerns an external client 8 or a terminal client 8. The client application 10 may in principle also be installed in an internal client 7.

The client 8 also comprises a sound card 19 which may be connected to a loudspeaker 20. Furthermore, a keyboard 21 is connected to the client 8. The server application 9 and the client application 10 can communicate via the established data link 4, that is, via the data network 4, as is indicated by a double arrow 30. For example, input instructions can thus be applied from the keyboard 21.

The method or the program package 12 operates as follows.

The control unit 14 is configured in such a manner that it is capable of representing essentially two different states at the output side. In the first state first control data is generated; this first data deviates from second control data which is generated in the second state. The control data is transmitted, via the external data network 4, in conformity with an arrow 22, that is, via the established data link 4, to the representation unit 16 which generates, in dependence on the incoming control data, image data which is applied to the client display screen 11 in conformity with the arrow 17; it then forms a control representation 23. The control representation 23 enables the user to optically recognize whether the present data link via the open and/or external data network 4 is reliable or not. In the case of a reliable data link, the first control data generates a first control representation 23 which deviates from a second control representation 23' which is generated on the basis of the second control data.

The control unit 14 is configured in such a manner that, after the reception of a trigger signal, it is in the first state and hence generates the first control data indicating the existence of a reliable data connection for a predetermined running time. When the control unit 14 is triggered again by a new trigger signal within this running time, the running time starts to run from the beginning again, so that the control unit 14 is permanently in the first state when suitably triggered and hence permanently generates the first control data which implements the display of the first control representation 23 on the client display screen 11. However, should the running time run out without a new trigger signal arriving, the control unit 14 automatically changes over to the second state in which it generates the second control data which lead to the display of the second control representation 23' on the client display screen 11. In order to enable the user to recognize unambiguously whether a reliable data link exists or not, the use of actual, concrete control representations 23, 23' is preferred. It is also possible in principle to generate the first control representation 23 or the second control representation 23' by abstaining from the display of a control representation, so that the first control data or the second control data is realized in that momentarily no data is transmitted from the control unit 14 to the representation unit 16 in conformity with the arrow 22.

In conformity with a preferred embodiment the control unit 14 is configured in such a manner that it is capable of generating a video sequence which consists of a series of single images. In the first state the first control data is generated in such a manner that the first control representation 23 forms a moving image sequence, that is an image sequence, on the basis of which the user can recognize a motion which is repeated quasi infinitely when the triggering is carried out accordingly. In contrast therewith, the second control data is chosen to be such that the second control representation 23' is formed by a stationary image, that is, by a still image. Preferably, use is made of an embodiment in which the video sequence depicts a vehicle, notably a steam locomotive, which is in motion during the first control representation and stands still during the second control representation. The motion of the vehicle may be symbolized, for example, by turning wheels, changes of position of the vehicle, development of smoke and the like.

Whether the first control representation 23 or the second control representation 23' is displayed on the client display screen 11 is thus dependent on whether the control unit 14 can be triggered in time, that is, within the running time. The triggering of the control unit 14 according to the present invention is governed by a test procedure which is carried out by the control unit 15. In the context of this test procedure the control unit 15 periodically generates a test message which is transmitted to the test unit 18, via the data link 4, in conformity with an arrow 24. The period of the test procedure with which the control unit 15 repeats the transmission of the test messages is chosen to be shorter than the previously mentioned running time during which the control unit 14 generates the first control data. For example, the running time amounts to from 5.5 to 6 seconds, whereas the period has a duration of approximately 5 seconds. In dependence on the incoming test message, the test unit 18 returns the same test message or a different test message to the server 2 via the data link 4. The returned test message may then be either returned, in conformity with an arrow 25, to the control unit 15 which tests the incoming test message and transmits, in the case of a positive test result, the trigger signal to the control unit 14 in conformity with an arrow 26 in order to reset the running time. The test message returned by the test unit 18 may also form the trigger signal and is then applied directly to the control unit 14 in conformity with an arrow 27. A further simplification is obtained when the test message applied from the control unit 15 to the test unit 18 already corresponds to the trigger signal. The control unit 15 then triggers the test unit 14 by applying the trigger signal in conformity with the arrow 24 via the data link 4, that is, via the data network 4, to the test unit 18 whereby it is returned to the control unit 14 in conformity with the arrow 27 and via the data link 4, that is, via the data network 4 again. When the trigger signal arriving at the control unit 14 arrives in time and can still be read, it may be assumed that the existing data link 4 is sufficiently reliable. For as long as this is the case, the control unit 14 applies the first control data in order to form the first control representation 23 on the client display screen 11. Via the same data link 4 the output unit 13 transfers its output data, in conformity with an arrow 28, to the representation unit 16 which forms therefrom image data which is applied, in conformity with the arrow 17, to the client display screen 11 on which it produces an output representation 29, for example, a protocol of the variation of the heart frequency and/or the contractions of the uterus.

It may in principle be arranged that the output representation 29 and the control representation 23 can be formed in the background on the client display screen 11, whereas other client applications are displayed in the foreground such as, for example, a display screen output of a text processing program or a display screen saver. When the data link via the data network 4 becomes unreliable in this constellation, possibly the second control representation 23' may still be formed; however, it cannot be recognized by the user if the control representations 23, 23' are formed only in the background.

In an advantageous further embodiment the test unit 18 may be configured in such a manner that this unit itself generates an error message if no test message reaches the test unit 18 from the control unit 15 during a predetermined test period. In any case this test period is longer than the duration of the test procedure, in particular about twice as long. The test unit 18 can then apply the error message in conformity with an arrow 31, directly to the client display screen 11 or via the graphic card, thus driving it so as to display a suitable warning indication 32. This warning indication 32 is effectively reproduced in the foreground, so that it is more likely to be optically observed by the user. Additionally, or alternatively, the test unit 18 can apply the error message, in conformity with an arrow 33, directly to the sound card 19 which then triggers the loudspeaker 20 to issue an acoustic signal in a suitable manner in conformity with an arrow 34. It may again be arranged that this acoustic warning signal is reproduced in the foreground.

For the case where the test message returned by the test unit 18, that is in particular the trigger signal, is not in order, the control unit 15 can generate an error message and apply it to the representation unit 16 in conformity with an arrow 35. On the client display screen 11 the latter unit generates therefrom a suitable warning indication 36 in addition to the control representation 23. It is also possible for said error message to be generated by the control unit 14 so as to be applied to the representation unit 16 in conformity with the arrow 22.

Additionally, or alternatively, the control unit 15 can apply an appropriate error message to the client application 10 in cases where the returned test message is incorrect or fails to arrive; in response to this error message the client application triggers the sound card 19, in conformity with an arrow 37, to output an acoustic warning signal. It is particularly effective when the control unit 15 applies this error message to the test unit 18 in conformity with the arrow 24, so that the latter unit drives the sound card 19 in conformity with the arrow 33.

For the data exchange the server application 9 and the client operation 10 generate at least one main channel 38 via which the bulk of the data is exchanged between the client 8 and the server 2. Notably the transmission of the output data and the control data takes place via this main channel 38. The test unit 18 generates at least one additional channel 39 parallel to and independent from the main channel 38. Via the additional channel 39, the test messages, that is, notably the trigger signal, are communicated between the server 2 and the client 8. Moreover, the additional channel 39 can also be used to drive the sound card 19 of the client 8 as from the server 2. The test unit 18 is configured notably as a DLL extension of the client application 10 (where DLL stands for Dynamic Link Library). Such a virtual additional channel 39 can be very simply formed by means of the DLL extension.

Figure 3:
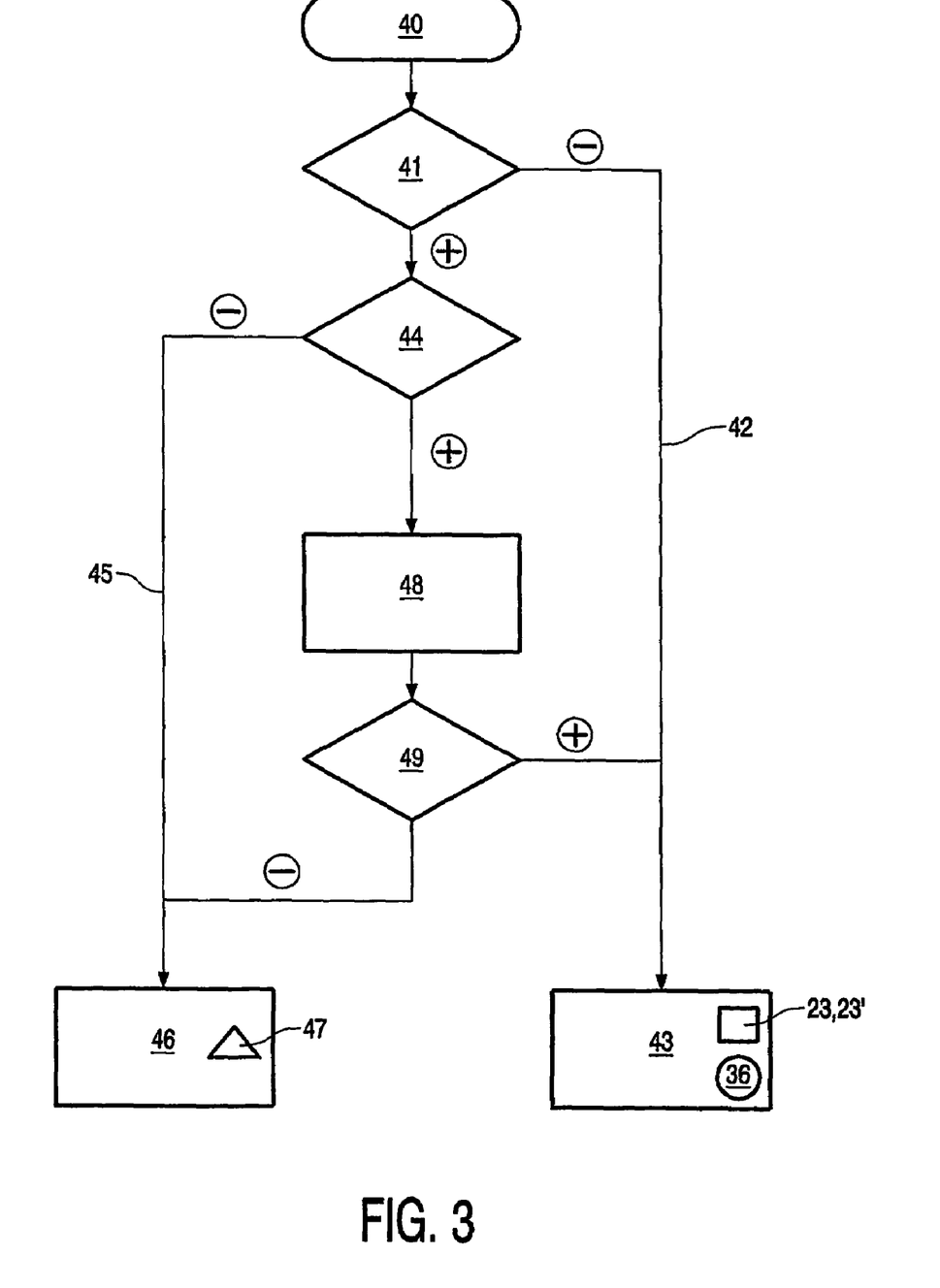
FIG. 3 shows a flow chart for logging a client into the server.

In conformity with FIG. 3, the client 8 can log into the server 2 as follows.

At 40 the server application 9 is started by the client 8 logging into the server 2. At 41 it is interrogated whether a terminal session is concerned. This interrogation 41 is necessary when the server application 9 is configured in such a manner that it can also run on the internal server 6, so that an internal client 7 can also log into the internal server 6. Theoretically speaking, an internal client 7 could also address the terminal server 2 via the internal or closed data network 3. If no terminal session is concerned, that is, when the interrogation result is negative (−), a branch 42 leads directly to the state 43 in which the server application 9 can reproduce the control representation 23 and possibly the warning indication 36 on the client display screen 11. Because in this case the data transmission takes place exclusively via the more reliable internal data network 3, the test procedure can be dispensed with so that the control unit 15 periodically triggers the control unit 14 directly.

If the result of the interrogation 41 is positive (+), at 44 a next interrogation is carried out as to whether the additional channel 39 is available. If the result of the interrogation is negative (−), a branch 45 leads directly to a state 46 in which the control representation 23 and the warning indication 36 are not displayed on the client display screen 11. If desired, in this state 46 a different, permanent warning indication 47 can be reproduced on the client display screen 11, signaling that a data link exists which has not been tested in respect of real-time data transmission. In case the interrogation result 44 is positive (+), in conformity with block 48 a connection message is applied to the test unit 18 by the control unit 15 via the additional channel 39. At 49 it is interrogated whether the test unit 18 has responded correctly to the connection message. For example, it is then tested whether appropriate communication with a compatible version of the test unit 18 is possible. A positive result (+) leads to the state 43 in which the control representation 23 and possibly the warning indication 36 can be reproduced on the client display screen 11; the triggering of the control unit 14 then takes place indirectly via the test unit 18 in conformity with the invention. A negative result (−) of the latter interrogation 49 once more leads to the state 46 in which the control representation 23 and the warning indication 36 are not reproduced but in which, if desired, the other warning indication 47 can be reproduced again.

It is thus ensured that the control representations 23, 23' and the warning indication 36, for example, in the form of a graphically reproduced alarm bell, appear on the client display screen 11 only if their function is indeed activated.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

LIST OF REFERENCES 1 network
2 server/terminal server/external server
3 closed and/or internal data network
4 open and/or external data network
5 patient monitoring device
6 server/internal server
7 client/internal client
8 client/external client/terminal client
9 server application
10 client application
11 client display screen
12 software package
13 output unit
14 control unit
15 control unit
16 representation unit
17 arrow
18 test unit
19 sound card
20 loudspeaker
21 keyboard
22 arrow
23 control representation
24 arrow
25 arrow 26 arrow
27 arrow
28 arrow
29 output representation
30 double arrow
31 arrow
32 warning indication
33 arrow
34 arrow
35 arrow
36 warning indication
37 arrow
38 main channel
39 additional channel
40 start of server application
41 interrogation
42 branch
43 state
44 interrogation
45 branch
46 state
47 warning indication
48 transmission of a connection message
49 interrogation

The invention claimed is:

1. An apparatus for monitoring the reliability of a data link for a data transmission between a server data processing apparatus and a client data processing apparatus, the apparatus comprising:
a server application program is run on the server data processing apparatus, which server application program comprises:
a first control unit for generating control data, and
a second control unit,
a client application program is run on the client data processing apparatus, which client application program comprises:
a representation unit for generating image data for representing an image on a client display screen which is connected to the client data processing apparatus, and
a test unit,
a data link over which the server application program and the client application program exchange data,
the representation unit being configured to generate, in dependence on incoming control data, image data to form a control representation on the client display screen,
the first control unit being configured to:
triggered by a trigger signal,
generate first control data after the arrival of the trigger signal and for a predetermined running time which starts anew at each trigger signal, the first control data generating a first control representation on the client display screen, which first control representation optically informs the user of the existence of a reliable data link,
generate second control data after expiration of the running time, which second control data generates a second control representation on the client display screen which optically informs the user of the absence of a reliable data link,
the second control unit being configured to carry out a test procedure during which the second control unit periodically transmits a test message to the test unit,
the test unit being configured to return, in dependence on the incoming test message, this test message or a different test message to the server application program,
the first control unit further being configured to:
be triggered in the context of the test procedure only if the returned test message is in order, and
the second control unit being configured to repeat the transmission of the test messages with a time period shorter than a running time during which the first control unit generates the first control data.

2. A method of monitoring the reliability of a data link for a data transmission between a server data processing apparatus which runs a server application program, which server application program comprises a first control unit for generating control data and a second control unit, and a client data processing apparatus which runs a client application program, which client application program comprises a representation unit for generating image data for representing an image on a client display screen which is connected to the client data processing apparatus, and a test unit, the server application program and the client application program exchanging data via a data link, the method comprising:
with the representation unit generating, in dependence on incoming control data, image data in order to form a control representation on the client display screen,
triggering the first control unit with a trigger signal,
with the first control unit, generating after the arrival of the trigger signal and for a predetermined running time which starts anew at each trigger signal, first control data which generate a first control representation which optically informs a user of the existence of a reliable data link on the display screen,
with the first control unit, generating second control data after expiration of the running time, which second control data generates a second control representation on the client display screen which optically informs the user of the absence of a reliable data link,
with the second control unit, carrying out a test procedure during which a test message is periodically transmitted to the test unit,
with the test unit, returning in dependence on each received test message, a reply test message to the server application program, triggering the control unit in the context of the test procedure in response to receiving the reply test message is in order, and
repeating the test procedure with which the first control unit with a period between the first transmission of the test messages which is shorter than the running time during which the first control unit generates the first control data.

3. The method as claimed in claim 2, further including:
transmitting the trigger signal to the first control unit from the test unit.

4. The method as claimed in claim 2, further including:
transmitting the trigger signal from the second control unit in response to the reply message from the test unit.

5. The method as claimed in claim 2, further including:
generating an error message in response to no test message from the second control unit reaching the test unit during the predetermined test running time,
applying the error message directly to the representation unit,
with the representation unit, forming on the basis of the test message, a warning indication on the client display screen which can be optically recognized by the user and
a sound card which outputs, on the basis of the error message, via a loudspeaker, a warning indication which can be acoustically recognized by the user.

6. The method as claimed in claim 2, further including:
connecting the server data processing apparatus to one of: an open or external data network and to a closed or internal data network to form the data link between the server data processing apparatus and the client data processing apparatus,
with the second control device, testing, when the client logs into the server data processing apparatus, whether the client logs in via the open or external data network or via the closed or internal data network,
in response to the client logging in via the open or external data network, with the second control unit starting the test procedure and transmitting a first test message to the test unit,
in response to the client logging in via the closed or internal data network, not starting the test procedure with the second control unit and repeatedly transmitting, independently therefrom, trigger signals to the first control unit with a period less than the running time.

7. The method as claimed in claim 2, further including:
with the second control unit, carrying out a function test prior to the execution of the test procedure or in the context of the test procedure, which function test tests whether the test unit is present and/or which version of the test unit is involved and/or whether communication with the test unit is possible,
in response to appropriate communication with a compatible version of the test unit being possible, with the control unit starting or continuing the test procedure and in response to appropriate communication not being possible, not starting or interrupting the test procure and driving the first control unit in such a manner that it does not transmit control data to the representation unit.

8. The method as claimed in claim 7, further including:
in response to the appropriate communication with a compatible version of the test unit not being possible, with the control unit, generating an error message and applying it to the representation unit,
with the representation unit, forming, on the basis of the error message, a suitable warning indication on the client display screen which can be optically recognized by the user.

9. The method as claimed in claim 7, further including:
in response to the test message returned by the test unit evaluating the returned test message with the second control unit for the function test.

10. The method as claimed in claim 2, wherein the data link between the client and the server is formed by an open or external data network, and further including:
with one of the server application program and the client application program, generating at least one main channel for data transmission and with the representation unit receiving the output data and the control data via the main channel,
with the test unit, generating at least one additional channel for data transmission and transmitting the test messages via the additional channel.

11. The method as claimed in claim 10, further including:
in the context of the test procedure, with the second control unit, generating an error message in response to the test message returned by the test unit not being in order and applying the error message, via the additional channel, to the test unit,
with the test unit, driving in response thereto a sound card of the client data processing apparatus to generate a suitable warning indication which can be acoustically perceived by the user.

12. The method as claimed in claim 2, further including:
in the context of the test procedure, with the second control unit, generating an error message in response to the test message returned by the test unit not being in order and applying the error message to the representation unit,
with the representation unit, forming on the client display screen, on the basis of the error message, a suitable warning indication which can be optically recognized by the user.

13. The method as claimed in claim 2, further including:
with the control unit, generating a video sequence, in which the first control representation is formed by a moving sequence of images and the second control representation is formed by a still image.

14. The method as claimed in claim 2, further including:
continuously generating patient data with at least one patient monitoring device,
with the server application program, enabling at least one a client data processing apparatus to access the patient data of one or more of the at least one patient, and
with an output unit of the server data processing apparatus, preparing the patient data of the one or more of the at least one patient and forming therefrom output data which forms on the client display screen, via the representation unit, an output representation which is suitable to enable monitoring of the patient data by the user.

15. The method as claimed in claim 14, wherein at least one of the patient monitoring devices is a childbirth monitoring device.

16. A computer medium carrying software code which when implemented on one or more processors performs the method of claim 2.

17. A system which monitors reliability of data link over which output data is transmitted, the system comprising:
a terminal server including one or more processors programmed to:
receive data to be output as the output data,
establish a main channel over the data link over which main channel the output data are transmitted and control data are transmitted,
control the control data to have a first state of a first time period and a second state after the first time period, and
establish at least one additional channel over the data link over which additional channel test messages are transmitted with a periodicity shorter than the first time period,;
a terminal client including one or more processors programmed to:
receive the output data,
generate a visual representation of the received output data for display on a display device,
receive the control data,
in response to the control data having the first state, generate a first representation for display on the display device and, in response to the control data having the second state, generate a second representation for display on the display device, the first representation being indicative of the data link being reliable and the second representation being indicative of the data link being unreliable, and
receive the test messages and transmitting a reply message over the additional data link;
the one or more terminal server processors further being programmed to:
in response to receiving the reply message, restart the first time period, such that as long as reply messages are received in intervals shorter than the first time period, the control signal remains in the first state and the first representation is displayed on the display device.

18. The system as claimed in claim 17, further including:
a plurality of physiological parameter monitors which monitor a physiological parameter of a subject, the monitors being connected with the terminal server to supply monitored physiological parameters thereto as the data to be output as the output data such that displaying the first representation on the display device indicates to a user that the displayed physiological data is current physiological data.

19. A method for monitoring the reliability of a data link over which output data is transmitted, the method comprising:
receiving data to be output as the output data,
establishing a main channel over the data link over which main channel the output data and control data are transmitted,
controlling the control data to have a first state for a first time period and a second state after the first time period,
establishing at least one additional channel over the data link and transmitting test messages over the additional channel with a periodicity shorter than the first time period,
receiving the output data which has been transmitted over the data link,
generating a visual representation of the received output data for display,
receiving the control data which has been transmitted over the first channel of the data link,
in response to receiving control data having the first state, generating a first representation on the display and in response to the received control data having the second state, generating a second representation on the display, the first representation being indicative of the data link being reliable to transmit current data and the second representation being indicative of the data link being unreliable for displaying output data substantially in real time,
receiving the test message which has been transmitted over the additional channel of the data link and transmitting a reply message over the additional data link,
in response to the reply message, restarting the first time period such that as long as reply messages are received in intervals shorter than the first time period, the control signal remains in the first state and the first representation is displayed.

20. The method as claimed in claim 19, further including:
measuring physiological data of a patient, the physiological data being the received data which is output onto the main channel of the data link as the output data,
displaying a visual representation of the measured physiological data on the display.

* * * * *